(12) United States Patent
Heberer

(10) Patent No.: US 6,518,586 B1
(45) Date of Patent: Feb. 11, 2003

(54) WALL ELEMENT FOR A PROTECTIVE DEVICE SURROUNDING AN OPERATING OR WORKING AREA AND PROTECTING AGAINST LASER BEAMS FROM A LASER SOURCE

(76) Inventor: Erwin Martin Heberer, Hans-Hembergerstrasse 74, D-63150 Heusenstamm (DE)

( * ) Notice: Subject to any disclaimer, the term of this patent is extended or adjusted under 35 U.S.C. 154(b) by 0 days.

(21) Appl. No.: 09/230,033
(22) PCT Filed: Jul. 17, 1997
(86) PCT No.: PCT/EP97/03833
§ 371 (c)(1),
(2), (4) Date: Sep. 2, 1999
(87) PCT Pub. No.: WO98/03815
PCT Pub. Date: Jan. 29, 1998

(30) Foreign Application Priority Data

Jul. 18, 1996 (DE) .......................... 196 29 037

(51) Int. Cl.⁷ .............................. G21F 7/00; G21F 5/00
(52) U.S. Cl. ................ 250/515.1; 250/506.1; 250/507.1
(58) Field of Search .................. 250/515.1, 506.1; 376/272; 359/886, 887

(56) References Cited

U.S. PATENT DOCUMENTS

| | | | | |
|---|---|---|---|---|
| 3,889,125 A | * | 6/1975 | Gerber .......................... 250/308 |
| 4,074,141 A | * | 2/1978 | Bryant .......................... 250/517 |
| 4,350,978 A | * | 9/1982 | Riccobono .................. 340/550 |
| 4,650,287 A | * | 3/1987 | Kudo et al. ............... 250/515.1 |
| 4,789,239 A | * | 12/1988 | Onishi et al. ................ 356/316 |
| 4,914,306 A | * | 4/1990 | Dufrane et al. .......... 250/506.1 |
| 5,108,293 A | * | 4/1992 | Stack et al. .................. 356/336 |
| 5,130,184 A | * | 7/1992 | Ellis ............................ 428/245 |
| 5,151,095 A | * | 9/1992 | Teeple ............................. 606/2 |
| 5,326,616 A | * | 7/1994 | Butterworth et al. ........ 128/849 |
| 5,450,065 A | * | 9/1995 | Greenfield .................. 340/584 |
| 5,992,417 A | * | 11/1999 | Toepel ......................... 128/846 |
| 6,028,724 A | * | 2/2000 | Leib ............................ 359/886 |

FOREIGN PATENT DOCUMENTS

| | | |
|---|---|---|
| DE | 8908806 | 8/1989 |
| EP | 0157221 | 10/1985 |
| FR | 2599467 | 12/1987 |
| GB | 2171513 | 8/1986 |

\* cited by examiner

Primary Examiner—John R. Lee
Assistant Examiner—Kalimah Fernandez
(74) Attorney, Agent, or Firm—Liniak, Berenato & White

(57) ABSTRACT

The invention relates to a wall segment (10) for device, such as a cabin, a wall or a screen, protecting against laser beams from a laser source (38) and enclosing a work or effective zone, this wall segment comprising an inner wall (12) adjacent to the work or effective zone and an outer wall (14) parallel to the inner wall (12) and farther away from the work and effective zone than the inner wall (12). To activate an emergency OFF system to shut down the laser source or the processing machine, the inner and outer walls (12) and (14) resp. are metallic, for instance of iron or steel sheetmetal, the inner wall (12) being fitted at least on its side (18) facing the work or effective zone with a highly absorbent coating (16) and the side (22) of the outer wall (14) facing the inside wall (12) being of lower absorption.

29 Claims, 1 Drawing Sheet

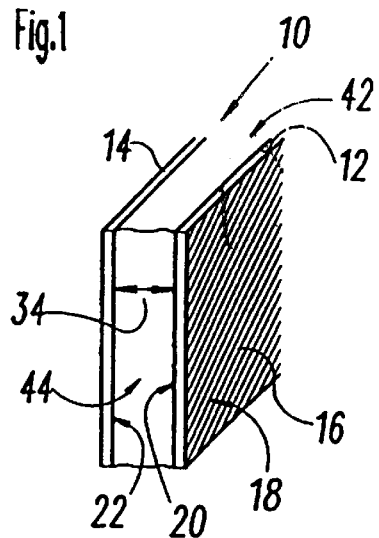
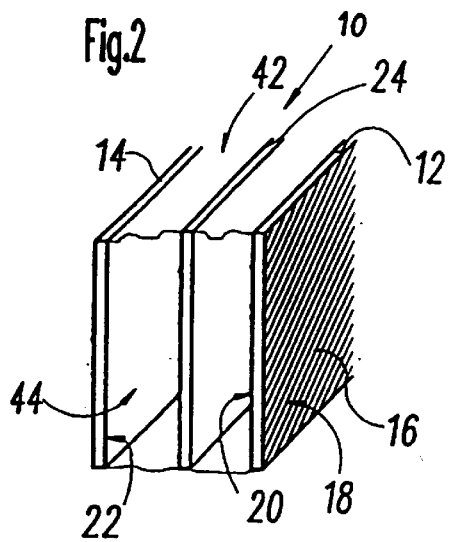
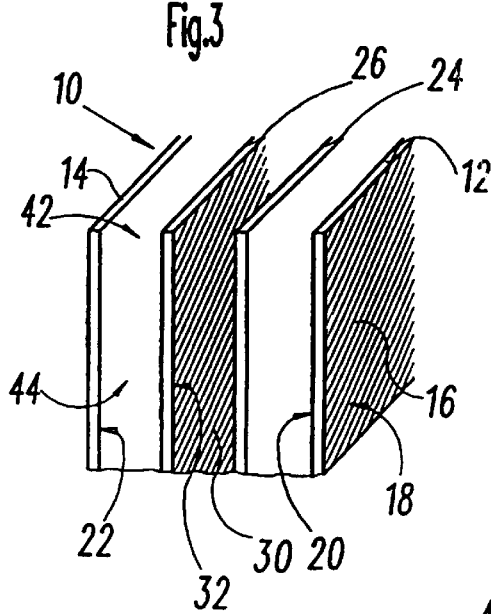
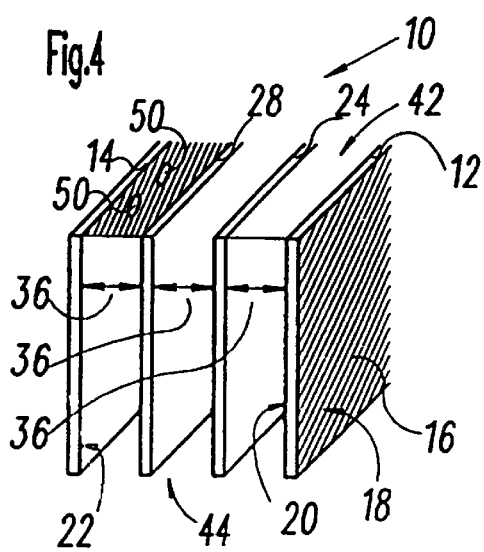
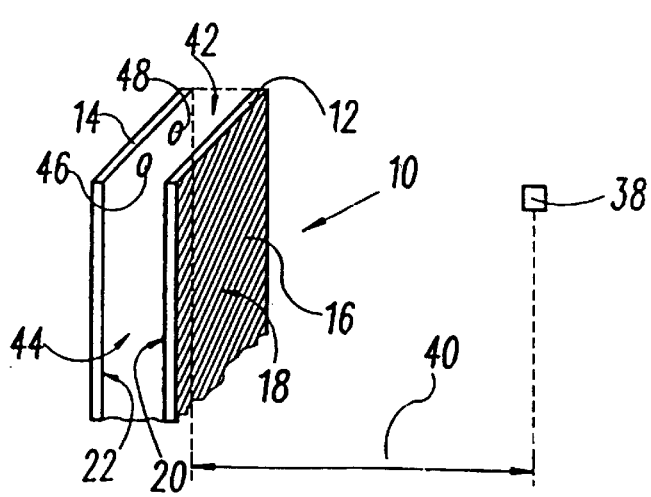

WALL ELEMENT FOR A PROTECTIVE DEVICE SURROUNDING AN OPERATING OR WORKING AREA AND PROTECTING AGAINST LASER BEAMS FROM A LASER SOURCE

DESCRIPTION

The invention relates to a wall segment of a protective device illustratively in the form of a cabin, a wall or a screen, enclosing a work zone or the effective region of laser beams from a laser source, said wall segment comprising an inner wall near the working or effective zone and an outer wall parallel to the inner one and more remote than latter from this work or effective zone.

Such a protective device fitting a laser beam processing machine is already known from the German patent document 89 08 806 U1. The wall segments of this protective device consist of an outer glass or plastic pane, of a fusible wire as a conductor and meandering along the inside of the outer pane and of an inner pane of a plastic material or of one absorbing the laser beams. The fusible wire is connected by leads to an emergency OFF circuit of the processing machine. If during anomalous operation of the processing machine the laser beam falls on one of the wall segments, the relatively high absorptivity of the material of the inner pane causes this pane to melt over a comparatively large area. The generated temperatures are high enough to melt the nearest conducting wire and thereby to interrupt the low continuous current in it. Because the current is cut, the emergency OFF circuit, and hence the laser source and the processing machine all are shut down. The emergency OFF circuit is designed to respond before the glass pane of the wall segment has been fully melted by the incident laser beam.

Moreover surveillance techniques of fiber optics cables in the laser system or surveillance techniques of the laser optics are known. When laser welding, the generated plasma also can be monitored using a photocell. Lastly systems may be fitted into the laser optics which based on residual reflection detect whether beam from the laser source passes through the optics and is scattered into the room.

The objective of all known surveillance or protective systems is to actuate an emergency OFF system allowing to shut off the laser source or the processing machine.

Practical experience as well as past accidents have shown that such known surveillance systems do not provide 100% reliability against the laser beam leaving the protective device because the emergency OFF device cannot in all conceivable cases be activated quickly enough to reliably preclude the laser beam from exiting the protective device until the above melting has been consummated.

Professional discussions also show that the known protective devices have been unsatisfactory. Illustratively requirements are set on the materials used for the wall segments in the article "Abschirmungen an Laser-Arbeitsplaetzen" ("Screening laser work places") in prEN 12,254 of November 1995, however solutions were not offered. Furthermore the draft of the 20th IEC 8254 "Laserguards" has been discussed world-wide but is presently being revised. This draft proposed passive wall segments filled inside with pressurized water or air. These wall segments must be absolutely tight, entailing high production costs.

Also, in case of malfunction, the water from the wall segment may escape into work sites or the likes, entailing electrical danger. If using such pressurized containers as wall segments, further regulations relating to pressurized-container safety may have to be observed. The above draft also discussed active wall segments for a laser-beam protective system, with a design similar to that of the passive ones, but fitted with sensors detecting the inside pressure or the temperature differential between the inside and outside spaces. While solutions of this kind may well lead to satisfactory results, the design complexity and the manufacturing cost of such wall segments must be prohibitive.

On the other hand the objective of the present invention is to so further develop a wall segment of the initially cited kind that it will be exceedingly simple to manufacture and that simultaneously it will meet the present requirements of protective devices for the laser class 1. Therein the wall segment must have a life of 100 seconds. In other words, the laser beam may not pierce the wall segment within this time interval. Furthermore the MZB values must be observed. Within the scope of the present application, the expressions "laser beams" or "laser sources" denote such lasers of which the powers are high enough to be material-destructive. These laser sources may be $CO_2$, lasers with powers up to 30 kw, further ecimer, helium, argon, ruby and Nd-YAG lasers.

Essentially the invention solves this problem by making the inner and outer walls of metal, for instance iron or steel sheetmetal, the inner wall being fitted at least on its side pointing toward the work or effective zone with a highly absorbent coating and the absorptivity of the outer wall surface facing the inner wall being low.

This wall segment offers the advantage that in case of malfunction and of a diverging laser beam incident on the wall segment, the coating deposited on its side will be heated at the beam incidence and will start to burn. The radial heat dissipation from the point of incidence being inadequate, the ignition site shall be narrowly constricted to a circular area provided suitable paints be used. The gases so generated broaden the beam beyond its own divergence, that is the beam is deformed (thermal blooming) and consequently the laser beam power density is substantially reduced. The temperature near the edge of the diverging beam is also substantially reduced by the gases generated in the combustion of the inner wall coating. The outer wall side of lower absorptivity, ie of higher reflectance, reflects the heat energy radiated by the inner wall outer surface, and only slight heating of the outer wall side is to be expected during the 100 second interval. As a whole, the wall segment of the invention is exceedingly economical in cost and design, the deliberate generation of gas or vapor at the site of incidence caused by the errant laser beam creating effective attenuation of the laser beam by strongly scattering the laser light in the gases or vapors.

In a first advantageous embodiment of the invention, the coating is composed of black paint. Because of the additional coating on the inner wall's inside, burning through the inner wall of the wall segment due to a malfunction will cause much gas or vapor to be formed between inner and outer walls of the wall segment and will assure further divergence, ie attenuation of the laser beam power density.

It was found advantageous in this respect to mount at least one partition between the inner and outer walls. Such partitions are especially useful when the wall segments are used to screen extremely high power laser beams, for instance from Nd-YAG lasers operating at several kw.

The at least one partition may be made of metal, for instance iron or steel sheetmetal and/or of graphite or graphite-coated sheetmetal. Graphite or graphite-coated sheetmetal is especially appropriate because of the high absorptivities involved. Illustratively special combinations of partitions within the wall segment allow increasing the wall segment life beyond the value of 100 s, or else, screening laser beams of powers above 10 kw.

In another advantageous embodiment of the invention, one partition may be fitted at least on one side with a coating, especially of black paint. If in case of malfunction the inner wall should already have been melted by the laser beam, then the deposited coating on the partition will burn and generate gas or vapor, further broadening the laser beam which thereby is attenuated.

Further it was found advantageous to coat the partition adjacent to the outer wall with a highly absorbent paint and to make the partition adjacent of the inner wall only slightly absorbent. This special configuration further increases the life of the wall segment, or the required strength also can be achieved at higher laser powers.

In many applications a partition consisting of a sheetmetal coated with graphite or being all graphite was found practical.

The spacing between the wall segment's inner and outer walls is approximately the diameter of the initial laser beam. The expression "initial beam" denotes the beam issuing from the laser before it enters the optics. When observing this dimension, especially effective scattering of the beam, that is attenuation of the power density, will be achieved.

It was found advantageous that the spacings between adjacent walls, for instance between inner wall and partition or between partition and partition or between partition and outer wall, also approximately correspond to the laser beam's initial diameter. It speaks for itself that larger spacings between walls may be used, requiring of course finding a tradeoff between maximum thickness of the wall segment and its effectiveness.

Practical experimentation has shown that a spacing or 60 mm or more between adjacent walls is appropriate.

In a further advantageous embodiment of the invention the distance between the wall segment and the laser source shall be at least four-fold to five-fold the focal length of the laser optics. In principle the wall segment may not be placed in the focusing range of the laser optics because of the very high power density present therein. Moreover such a configuration of the wall segments also takes into account corresponding safety, that is accident regulations.

In another embodiment of the invention, the end faces of the multi-shell wall segment are preferably sealed on all sides. Thereby the wall segments are easily handled and easily combined into a larger composite, and in addition the gases or vapors generated inside the wall segment in case of malfunction will be concentrated and prevented from escaping quickly.

In a further embodiment of the invention the wall segment comprises boreholes in a vertical, upper segment, preferably in the zone of the end face. These boreholes allow constrained exhaust of the smoke generated inside the wall segment during malfunction.

A smoke or gas sensor connected to a control unit and mounted between the wall segment's inner and outer walls offers additional safety. This control unit may emit emergency signals during malfunction and is particularly appropriate for fully automated laser systems not always attended by operators. However the control unit also may be used to correspondingly act on the laser, for instance by shutting it off or by reducing its power or the like.

In a further advantageous development of the invention, at least two sensors are mounted in the wall segment at different positions. The use of a second sensor takes into account the possibility of a laser beam happening to be precisely incident during malfunction on one such sensor, and accordingly the other one provides a useful redundant system.

In a particularly advantageous embodiment of the invention, the inner and outer walls and any partition(s) in between are fitted with mutually flush panes consisting of sequential polycarbonate or glass layers to allow optically monitoring the work zone from the outside and through the wall segment. It was ascertained that such pane configurations withstand loading by $CO_2$ and also Nd-YAG lasers. Manifestly this feature must be ascribed to the laser beam already losing significant power when passing through the first pane and therefore the load on the second and spaced pane is delayed. The time delay(s) can be further increased by mounting further pane(s).

As regards a protective device against laser beams fitted with at least one wall segment, this device advantageously is a framework for ease of manufacture, this frame consisting of steel beams and the walls being affixed to it.

The invention is elucidated below in relation to the embodiments shown in the drawings.

FIG. 1 shows a first embodiment of the wall segment of the invention comprising one inner and one outer wall, FIG. 2 shows a second embodiment of the invention of FIG. 1 comprising an additional partition, FIG. 3 shows a further embodiment of the wall segment of the invention of FIG. 1, comprising two partitions, FIG. 4 shows a further embodiment of the wall segment of the invention of FIG. 1 comprising two partitions, one partition being made of graphite or being coated with it, and FIG. 5 shows a further embodiment of the wall segment of the invention of FIG. 1, with smoke sensors mounted in the inside space.

The wall segment 10 shown in FIG. 1 is part of a protective device against the beams of a laser source 38 and comprises at least an inner wall 12 and a substantially parallel outer wall 14. The inner wall 12 and the outer wall 14 are metallic, preferably sheetmetal of iron or steel, the inner wall 12 being fitted at least on its side 18 facing the region subject to laser action, and preferably also on its outer side 20, with a coating 16. Preferably the coating 16 is a paint of high absorptivity, for instance black paint or the like. The side 22 of the outer wall 14 facing the inner wall 12 is only slightly absorbent. This low absorptivity or high reflectivity of the side 22 of the outer wall 14 is attained in practice by merely using a substantially untreated sheetmetal of iron or steel already comprising a reflecting surface and used as the outer wall 14. Clearly the side 22 of the outer wall 14 facing the inner wall 12 may be subjected to special treatment or processing to increase reflectivity. Preferably the side 20 of the inner wall 12 shall also be coated.

In the embodiment of FIG. 2, a partition 24 uncoated on both sides is present in the gap between the inner wall 12 and the outer wall 14 and offers low absorptivity, ie high reflectivity. It is understood that the partition also may be coated on one or both sides with a highly absorbent coating of paint. Such different designs depend on the particular applications.

In the embodiment of FIG. 3, two partitions 24, 26 are used, the partition 24 being uncoated, ie reflecting, and the partition 26 being coated, ie absorbent, in a special embodiment mode.

In the embodiment of FIG. 4, again two partitions 24, 28 are present between the inner wall 12 and the outer wall 14 of the wall segment, in this case the partition 28 consisting of graphite or being a graphite-coated sheetmetal. The partition 24 on the other hand is uncoated and highly reflective.

It is understood that changes in the above embodiments matching the particular applications can be used in the invention in arbitrary combinations. The basic concept of the invention is to generate particular gases, vapors or smoke, in the event of malfunction, by appropriately designing the wall segment 10. Individual walls fitted with a coating 16 are provided for that purpose. Illustratively the partition 26 may be fitted with a paint coat 30 at least on its inside 32 or also additionally on its outside. The spacings 32, 34 between the particular walls/partitions 12, 14, 24, 26, 28 substantially correspond to the diameter of the initial beam from the laser source 38. A space 34 or 36 between adjacent walls/partitions 12, 14, 24, 26, 28 of about 60 mm or more, was found practically appropriate. The distance 40 between the wall segment 10 and the laser source 38 should be about four-fold to five-fold the focal length of the laser optics.

The end faces 42, 44 of the multi-shell wall segment 10 preferably are substantially closed on all sides. However, as schematically and illustratively shown in FIG. 4, boreholes 50 may be present, preferably in a vertical, upper segment, preferably in the vicinity of the end face 42. Illustratively the construction of the wall segment 10 is a framework, the frame consisting of steel beams or similar cross-sectionally contoured beams, and the walls/partitions 14, 16, 24, 26, 28 being affixed to the frame.

Preferably two smoke or gas sensors 46, 48 connected to a control unit are mounted in the gap between the inner wall 12 and the outer wall 14 of the wall component 10 of the illustrative embodiment of FIG. 5.

PARTS LIST 10 wall segment
12 inner wall
14 outer wall
16 coating
18 side
20 side
22 side
24 partition (glossy)
26 partition (black)
28 partition (graphite)
30 coating of paint
32 side
34 spacing
36 spacing
38 laser source
40 distance
42 end face
44 end face
46 sensor
48 sensor
50 boreholes

What is claimed is:

1. A wall segment (10) for a device enclosing a work zone to protect against laser beams of a laser source (38), the wall segment (10) comprising an inner wall (12) adjacent to the work zone and an outer wall (14) substantially parallel to the inner wall (12) and further away from the work zone than the inner wall (12), characterized in that
the inner wall (12) and the outer wall (14) are both metallic sheet metal, the inner wall (12) is provided with a coating (16) at least on a side surface of the inner wall (12) facing the work zone, and a side surface of the outer wall (14) facing the inner wall (12) being of lesser absorption capability with respect to laser radiation than the coating (16).

2. The wall segment as claimed in claim 1, characterized in that the coating (16) is black paint.

3. The wall segment as claimed claim 1, characterized in that at least one partition (24, 28) is mounted between the inner wall (12) and the outer wall (14).

4. The wall segment as claimed in claim 1, characterized in that the at least one partition (28) is made of metal.

5. Wall segment as claimed in claim 4, characterized in that one partition (26) is fitted at least on one of its sides (32) with a coating (18).

6. Wall segment as claimed in claim 5, characterized in that the partition (26) adjacent to the outer wall (14) is fitted with a highly absorbent coating of paint (30) and that the absorption of the partition (24) adjacent to the inner wall (12) is low.

7. A wall segment (10) for a device enclosing a work zone to protect against laser beams of a laser source (38), the wall segment (10) comprising an inner wall (12) adjacent to the work zone and an outer wall (14) substantially parallel to the inner wall (12) and further away from the work zone than the inner wall (12), characterized in that the inner wall (12) and the outer wall (14) are both metallic sheet metal, the inner wall (12) is provided with a coating (16) provided to absorb laser radiation at least on a side surface of the inner wall (12) facing the work zone, and a side surface of the outer wall (14) facing the inner wall (12) being of lesser absorption capability with respect to laser radiation than the coating (16);
wherein at least one partition (24, 28) is made of one of iron sheet metal and graphite-coated sheet metal; one partition (26) is fitted at least on one of its sides (32) with a black-paint coating (18); and the partition (26) adjacent to the outer wall (14) is fitted with a coating of paint (30) provided to a absorb laser radiation so that the coating (16) on incidence of a laser beam begins to burn and that the absorption of the partition (24) adjacent to the inner wall (12) is being of lesser absorption capability with respect to the laser radiation than the coating of paint (30).

8. The wall segment as claimed in claim 1, characterized in that a spacing (34) between the inner wall (12) and the outer wall (14) corresponds approximately to the diameter of an initial beam of the laser source (38).

9. Wall segment as claimed in claim 1, characterized in that the spacings (36) between adjacent walls and/or partitions such as between the inner wall (12) and the partition (24) or between the partition (24) and the partition (26, 28) or between the partition (24, 26, 28) and the outer wall (14) corresponds approximately to the diameter of the initial beam of the laser source (38).

10. Wall segment as claimed in claim 1, characterized in that the spacing (34, 36) of adjacent walls and/or partitions (12, 14, 24, 26, 28) is at least 60 mm.

11. Wall segment as claimed in claim 1, characterized in that the distance (40) between the wall segment (10) and the laser source (38) is at least four-fold to five-fold the focal length of the fiber optics.

12. Wall segment as claimed in claim 1, characterized in that the end faces (42, 44) of the multi-shell wall component (10) are closed.

13. Wall segment as claimed in claim 12, characterized in that the boreholes (50) are present in a vertical, upper zone, in the zone of the end face 942).

14. Wall segment as claimed in claim 1, characterized in that a smoke or gas sensor (46, 48) connected to a control is mounted between the inner wall (12) and the outer wall (14).

15. Wall segment as claimed in claim 14, characterized in that at least two sensors (46, 48) are mounted at different positions in the wall component (10).

16. Wall segment as claimed in claim 1, characterized in that the inner and outer walls (12) and (14) resp. and any partition(s) (24, 26, 28) mounted in-between comprise essentially mutually flush polycarbonate or glass panes.

17. Wall segment as claimed in claim 16, characterized in that the panes consist of at least two, more sequentially mounted layers.

18. A protective device against laser beams with at least one wall segment as claimed in claim 1, characterized in that the protective device is a framework consisting of steel beams and that the walls and/or partitions (14, 16, 24, 26, 28) are affixed to this framework.

19. The wall segment as claimed in claim 1, wherein said inner wall and outer walls are made of one of iron and steel.

20. The wall segment as claimed in claim 4, wherein the at least one partition (24, 28) is made of one of iron sheet metal, a steel sheet metal, and a graphite-coated sheet metal.

21. The wall segment as claimed in claim 5, wherein said coating (18) is a black-paint coating (30).

22. A laser beam protective device comprising:
   a first outer wall having a first surface facing towards a laser source, said first surface having a first coating of a material of relatively low absorptivity and high reflectivity; and
   a second inner wall disposed between said first outer wall and said laser source, said second inner wall having an inner side facing said laser source and having a second coating of material of relatively high absorptivity;
   wherein said second coating burns when exposed to said laser beam.

23. The laser protective device according to claim 22, wherein said first outer and said second inner wall are made of a metallic material.

24. The laser protective device according to claim 22, further comprising:
   at least one gas sensor disposed between said inner and outer walls to detect gas emitted when said second coating of said second inner wall burns from exposure to said laser beam.

25. The wall segment as claimed in claim 1, characterized in that the coating (16) is provided to absorb a laser radiation so that the coating (16) on incidence of a laser beam begins to burn and the side surface of the outer wall (14) facing the inner wall (12) being of lesser absorption capability with respect to the laser radiation than the coating (16).

26. A wall segment (10) for a device enclosing a work zone to protect against laser beams of a laser source (38), the wall segment (10) comprising an inner wall (12) adjacent to the work zone and an outer wall (14) substantially parallel to the inner wall (12) and further away from the work zone than the inner wall (12), characterized in that
   the inner wall (12) and the outer wall (14) are both metallic sheet metal, the inner wall (12) is provided with a coating (16) of black paint at least on a side surface of the inner wall (12) facing the work zone, and a side surface of the outer wall (14) facing the inner wall (12) being of lesser absorption capability than the coating (16).

27. The wall segment as claimed in claim 26, characterized in that the coating (16) is provided to absorb a laser radiation so that the coating (16) on incidence of a laser beam begins to burn and the side surface of the outer wall (14) facing the inner wall (12) being of lesser absorption capability with respect to the laser radiation than the coating (16).

28. The wall segment as claimed in claim 1, wherein the coating has a high absorption capability of such kind that the coating on incidence of the laser beam begins to burn.

29. The wall segment as claimed in claim 25, wherein the coating (16) is black paint.

* * * * *